(12) United States Patent
Ho

(10) Patent No.: US 7,688,375 B2
(45) Date of Patent: Mar. 30, 2010

(54) DIGITAL IMAGE CAPTURING DEVICE WITH A SLIDABLE LCD

(75) Inventor: Chin-Hsin Ho, Hsinchu (TW)

(73) Assignee: Altek Corporation, Hsinchu (TW)

( * ) Notice: Subject to any disclaimer, the term of this patent is extended or adjusted under 35 U.S.C. 154(b) by 459 days.

(21) Appl. No.: 11/685,305

(22) Filed: Mar. 13, 2007

(65) Prior Publication Data

US 2008/0106606 A1   May 8, 2008

(30) Foreign Application Priority Data

Nov. 7, 2006   (TW) ............................... 95219644 U

(51) Int. Cl.
*H04N 5/222* (2006.01)
*H04N 5/225* (2006.01)

(52) U.S. Cl. ............................ 348/333.06; 348/333.01; 348/373

(58) Field of Classification Search ............ 348/333.01, 348/333.06, 373
See application file for complete search history.

(56) References Cited

U.S. PATENT DOCUMENTS

| 7,187,957 B2* | 3/2007 | Kato ........................ 455/575.3 |
| 2004/0137940 A1* | 7/2004 | Matsunami .............. 455/550.1 |
| 2006/0197861 A1* | 9/2006 | Won et al. .............. 348/333.06 |

* cited by examiner

*Primary Examiner*—Kelly L Jerabek
(74) *Attorney, Agent, or Firm*—Alan Kamrath; Kamrath & Associates PA

(57) ABSTRACT

A digital image capturing device is includes an LCD and a main body. The LCD has a first fastening element. The main body has a switching device a sliding shaft, a sliding shaft sleeve and a second fastening element. The sliding shaft has the sliding shaft sleeve that is slipped onto it and is connected with the LCD. The LCD can be slid and rotated with the above-described mechanism. The LCD utilizes the first fastening element to engage with the second fastening element of the main body, which allows the LCD to be securely attached. The digital image capturing device utilizes the sliding movement to control the switching device to operate the switching function.

19 Claims, 8 Drawing Sheets

# DIGITAL IMAGE CAPTURING DEVICE WITH A SLIDABLE LCD

BACKGROUND OF THE INVENTION

1. Field of the Invention

The present invention relates to a digital image capturing device and, more particularly, to a digital image capturing device with a slidable LCD having a switching function.

2. Description of the Related Art

With increasing pixel counts and improvements to image quality, digital image capturing devices, such as digital cameras and digital video cameras, are utilizing LCDs with increased sizes as well. Although enlarged LCDs can provide better visual effects, users still tend to prefer smaller-size digital image capturing devices for the sake of convenience. Therefore, the main body of the digital image capturing device usually remains about the same size. However, the large size of the LCD may cover function buttons on the main body. In prior art technology, the size of the function buttons was reduced, and the function buttons were moved onto the remaining space of the main body. However, the reduced-sized function buttons are inconvenient to operate, and susceptible to accidental activation.

In prior art technology, the LCD can only be rotated along two axes but is not able to slide, which may be inconvenient.

Therefore, it is desirable to provide a digital image capturing device with a slidable LCD having a switching function to mitigate and/or obviate the aforementioned problems.

SUMMARY OF THE INVENTION

An objective of the present invention is to provide a digital image capturing device with a slidable LCD.

Another objective of the present invention is to provide a digital image capturing device with an LCD having a switching function.

In order to achieve the above mentioned objectives, the digital image capturing device of the present invention comprises an LCD and a main body. The back side of the LCD comprises a first fastening element, a first protrusion, a second protrusion and a lateral rotating shaft sleeve. The main body comprises a switching device, a rotating element, a second fastening element, a switch disk, a plurality of function buttons and a sliding shaft. The sliding shaft has a sliding shaft sleeve that is slipped onto it. An engaging element is placed through the lateral rotating shaft sleeve to engage with a hole on the sliding shaft sleeve. The LCD can be slid with the above-described mechanism.

The sliding shaft sleeve can not only slide along the sliding shaft but can also be rotated. The LCD can, therefore, be flipped open or closed up against the main body. The LCD is connected to the lateral rotating shaft sleeve and the engaging element. Thus, the LCD can also rotate left and right.

An elastic element adjacent to the sliding shaft sleeve provides a positional bias to the sliding shaft sleeve to automatically move back to the original position. A buffer element adjacent to the sliding shaft sleeve generates a frictional force so that the LCD can be fixed at a predetermined angle while it is sliding or rotating. When the LCD is slid to a first position, the LCD utilizes the first fastening element to engage with the second fastening element of the main body, which prevents the LCD from flipping open when the digital image capturing device is shaken.

A switch method of the present invention is, when the LCD slides to the left, the first protrusion leaves from the rotating element to release the switching device to turn on the digital image capturing device. When the user wants to turn off the digital image capturing device, he or she pushes the LCD to the right. With, the structure of the second protrusion and the hook, the hook begins to rotate, and the second protrusion stops at the corner of the hook. Thus, the LCD is again securely attached. The user turns the switch disk to drive the hook, and the LCD begins to slide due to the positional bias provided by the elastic element. A torsion spring can be placed between the switch disk and the hook, and the torsion spring can pull the hook back to the original position.

Another switch method of the present invention is that a switching device is placed in a hole under the second fastening element. The switching device has a driven element and a small elastic element. When the first fastening element of the LCD engages with the second fastening element of the main body, the first fastening element presses the driven element and also indirectly presses the switching device to turn off the digital image capturing device. When the first fastener element is moved, the driven element is ejected by the small elastic element, the switching device is no longer pressed, and the digital image capturing device is thus turned on.

Other objectives, advantages, and novel features of the invention will become more apparent from the following detailed description when taken in conjunction with the accompanying drawings.

DETAILED DESCRIPTION OF THE PREFERRED EMBODIMENTS

Figure 1:
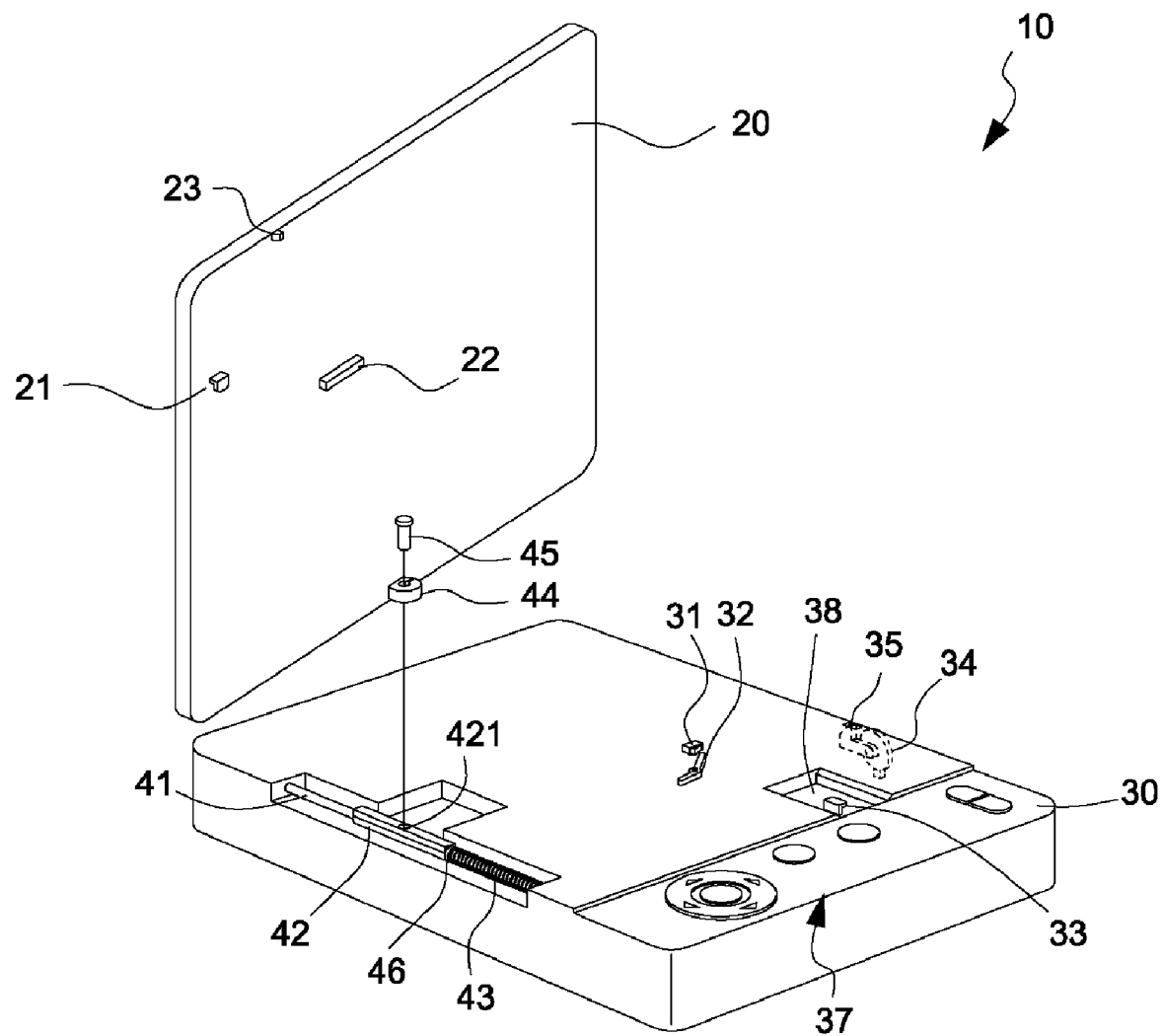
FIG. 1 is a schematic drawing of a digital image capturing device according to the present invention.

Please refer to FIG. 1. FIG. 1 is a drawing illustrating hardware components of a digital image capturing device according to the present invention.

A digital image capturing device 10 can be a digital camera, a digital video camera, or other such device. The digital image capturing device 10 comprises an LCD 20 and a main body 30. The digital image capturing device 10 utilizes an image processing module in the main body 30 to transmit images to the LCD 20. However, this technology is not a characteristic of the present invention, and so requires no further explanation. The back side of the LCD 20 comprises a first fastening element 21, a first protrusion 22, a second protrusion 23 and a lateral rotating shaft sleeve 44. The main body 30 comprises a switching device 31, a rotating element 32, a second fastening element 33, a switch disk 34, a hook 35, a plurality of function buttons 37 and a sliding shaft 41. The sliding shaft 41 has a sliding shaft sleeve 42 that is slipped onto it. An engaging element 45 is placed through the lateral rotating shaft sleeve 44 to engage with a hole 421 on the sliding shaft sleeve 42. The lateral rotating shaft sleeve 44 and the engaging element 45 are tightly engaged. The LCD 20 can be slid and rotated with the above-described mechanism, and operating procedures will be explained later.

The second fastening element 33 is placed in a scoop channel 38 in the main body 30. This scoop channel 38 can also contain the first fastening element 21 when the LCD 20 is pushed against the main body 30. The plurality of function buttons 37 are used for controlling the digital image capturing device 10, and when the digital image capturing device 10 is turned off, the plurality of function buttons can be hidden under the LCD 20.

The first protrusion 22 is used for pushing the rotating element 32 to control the switching device 31. The hook 35 hooks the second protrusion 23 when the digital image capturing device 10 is turned off, and so the LCD 20 cannot slide freely. The switch disk 34 and the hook 35 are connected to each other to allow a user to control the rotation of the hook 35. The corresponding operating procedures will be explained later.

Figure 2A:
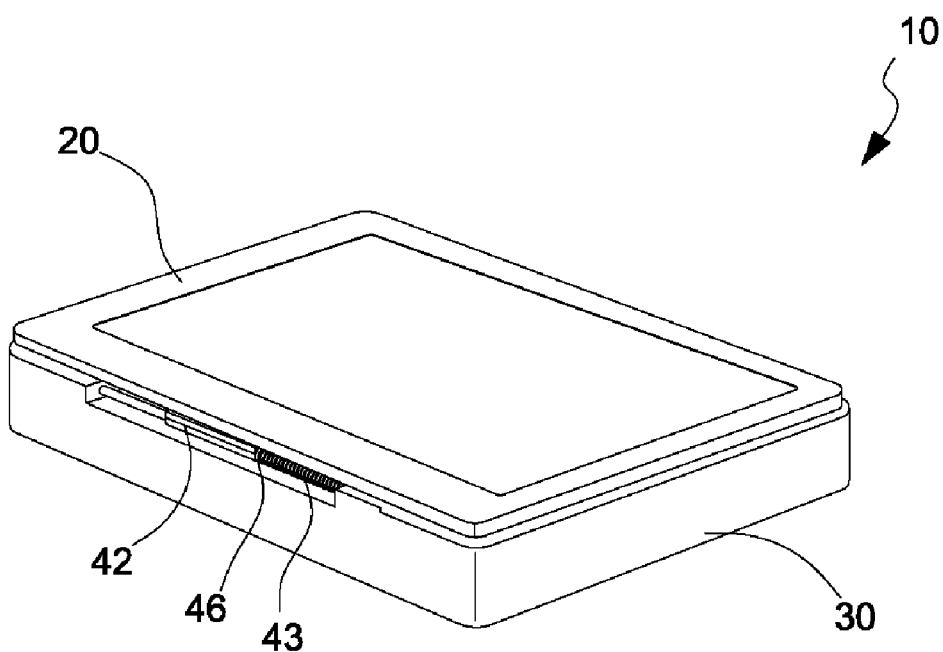
FIGS. 2A-2B are schematic drawings showing an LCD of the digital image capturing device being slid to the left and right.
Figure 2B:
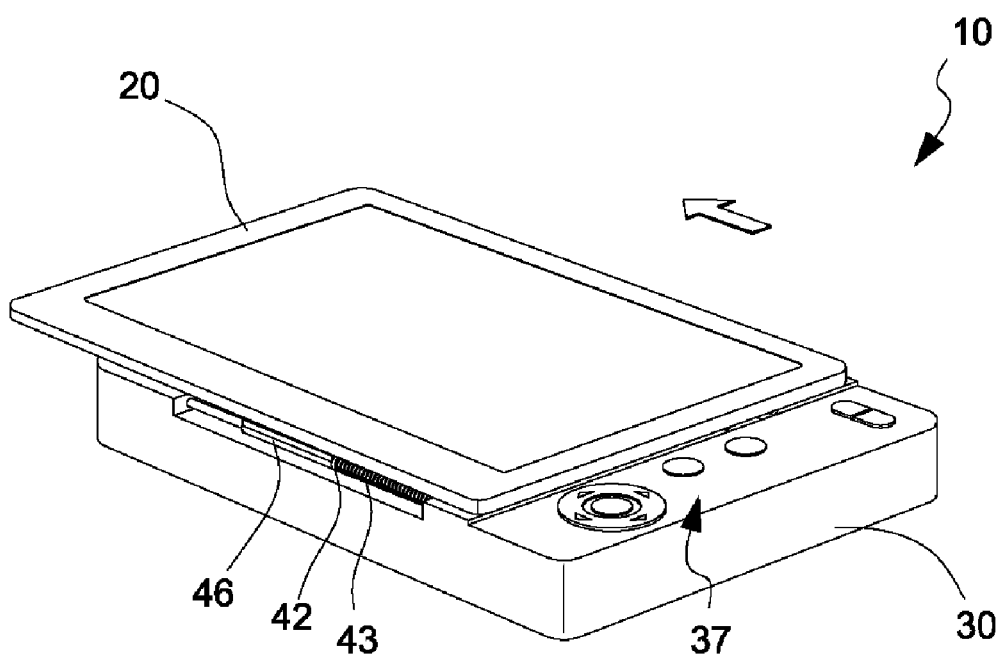

Please refer to FIGS. 2A-2B. FIGS. 2A-2B are schematic drawings showing an LCD of the digital image capturing device being slid to the left and right.

Since the LCD 20 and the sliding shaft sleeve 42 are connected together, the LCD 20 can slide together with the sliding shaft sleeve 42. An elastic element 43 adjacent to the sliding shaft sleeve 42 provides a positional bias to the sliding shaft sleeve 42 to automatically move back to the original position. A buffer element 46 adjacent to the sliding shaft sleeve 42 generates a frictional force so that the LCD 20 can be fixed at a predetermined angle while it is sliding or rotating. When the LCD 20 is slid to a turn-off position (as shown in FIG. 2A), the LCD 20 utilizes the first fastening element 21 (as shown in FIG. 1) to engage with the second fastening element 33 of the main body 30, which prevents the LCD 20 from flipping open when the digital image capturing device 10 is shaken. When the user turns on the digital image capturing device 10, the LCD 20 automatically slides away for a distance, and the plurality function buttons 37 are exposed (as shown in FIG. 2B). The LCD 20 can slide to the left and right with the sliding shaft sleeve 42, and this sliding movement can also be used for controlling the operational status of the digital image capturing device 10, which will be explained later.

Figure 3A:
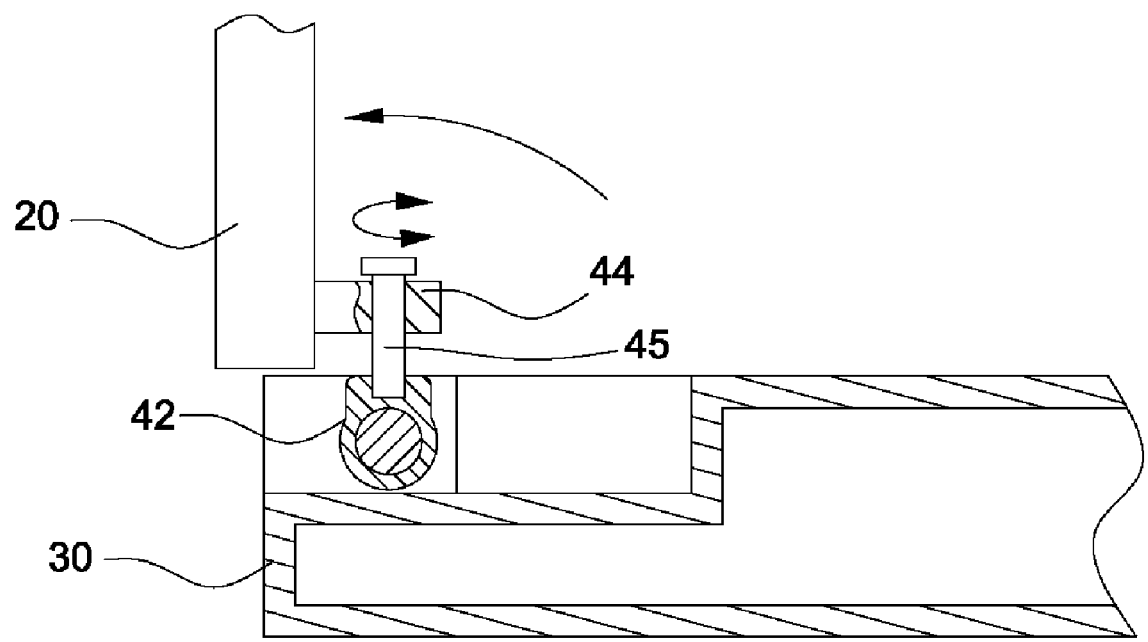
FIGS. 3A-3B are detailed drawings of an LCD of a digital image capturing device.
Figure 3B:
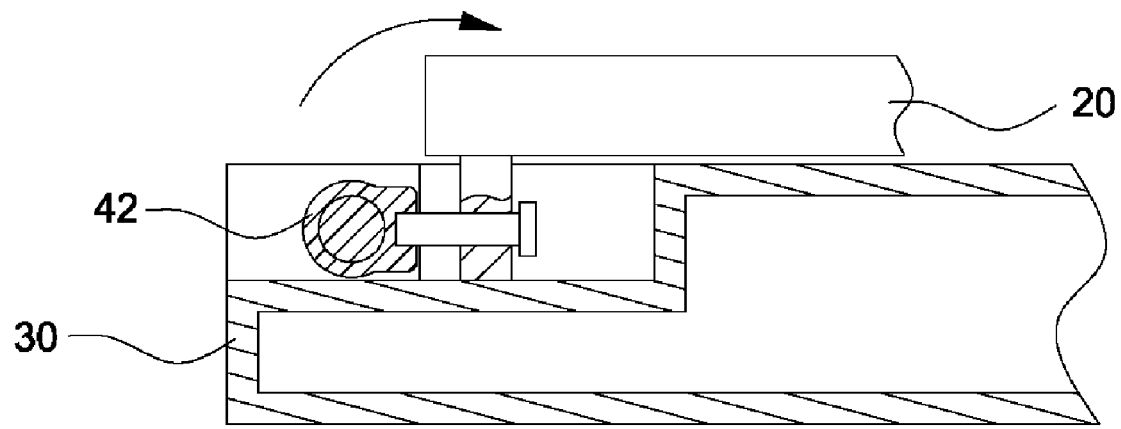
Figure 4:
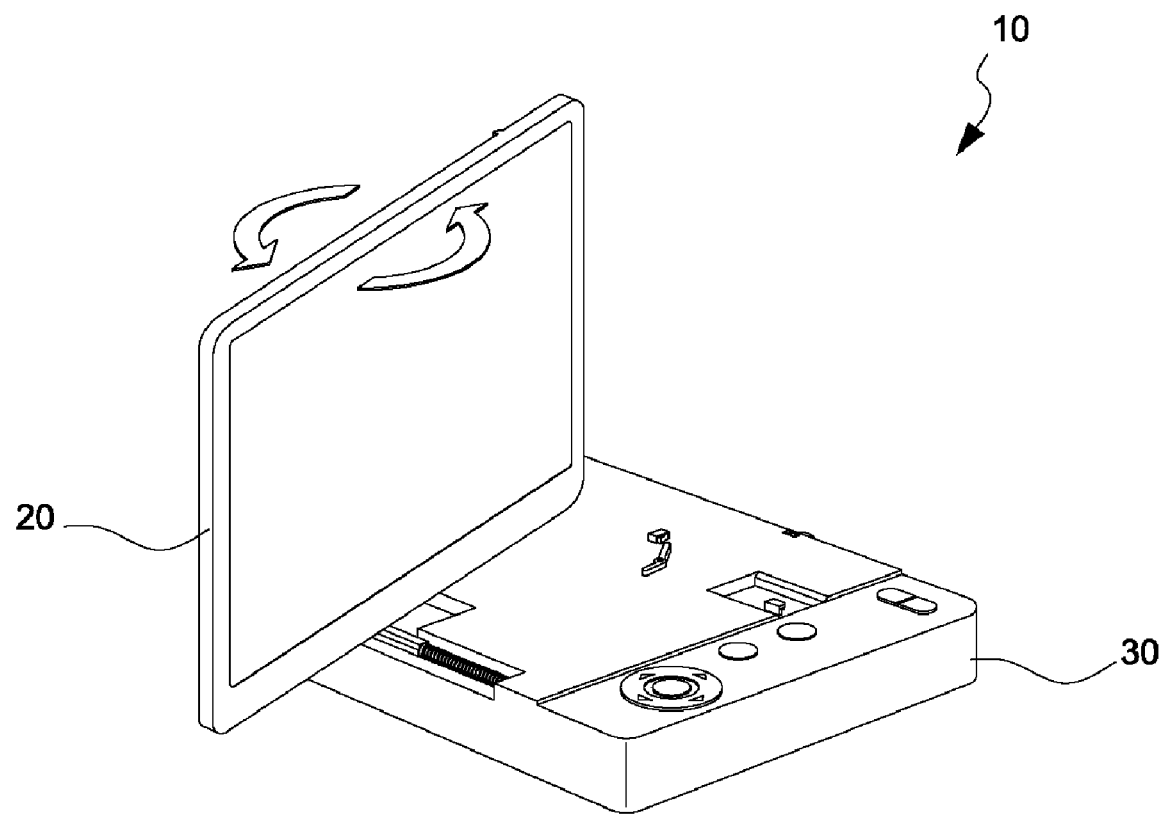
FIG. 4 is a schematic drawing showing an LCD of a digital image capturing device being rotated to the left and right.

Please refer to FIGS. 3A-3B and 4. FIGS. 3A-3B are detailed drawings of the structure for an LCD 20 of the digital image capturing device 10.

The sliding shaft sleeve 42 can not only slide along the sliding shaft 41 but can also be rotated. The LCD 20 can, therefore, be flipped open (as shown in FIG. 3A) or closed up against the main body 30 (as shown in FIG. 3B). Furthermore, the LCD 20 is connected to the engaging element 45 by the lateral rotating shaft sleeve 44, so the LCD 20 can also rotate left and right, as shown in FIG. 4. FIG. 4 is a schematic drawing showing the LCD of the digital image capturing device being rotated to the left and right. The user can adjust the LCD 20 to a preferred angle.

Figure 5A:
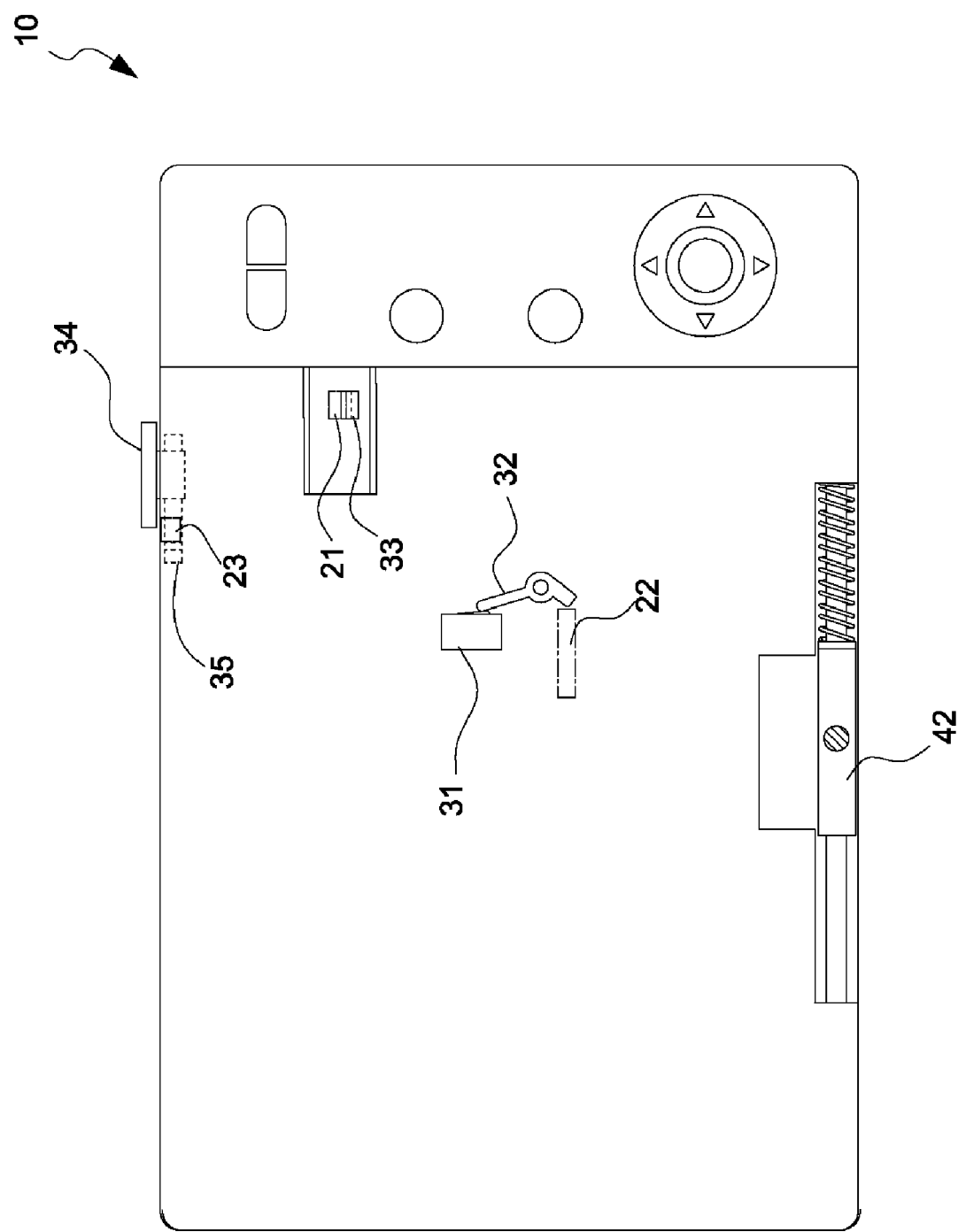
FIGS. 5A-5B are schematic drawings showing a first embodiment for turning on a digital image capturing device via an LCD.
Figure 5B:
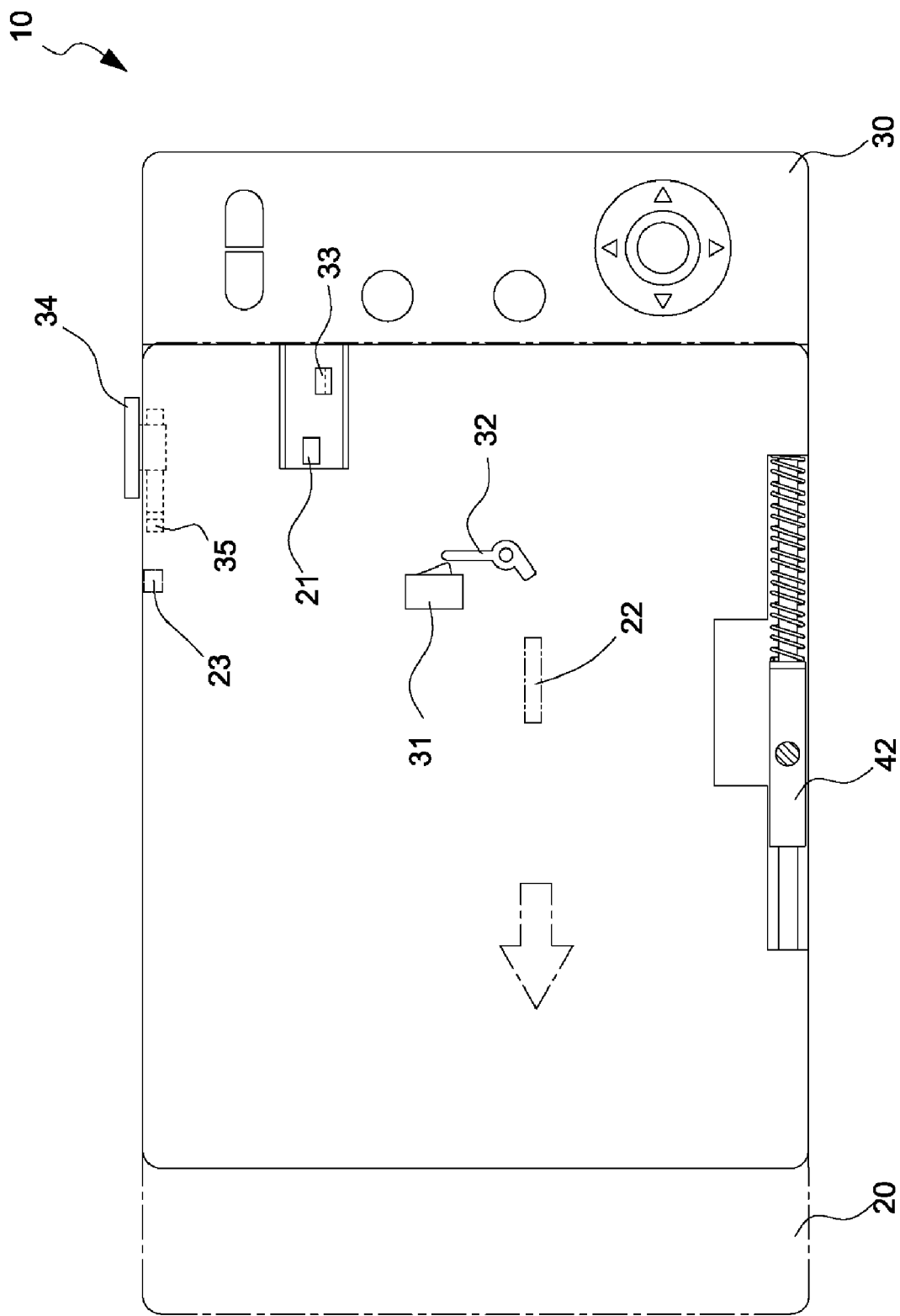
Figure 6A:
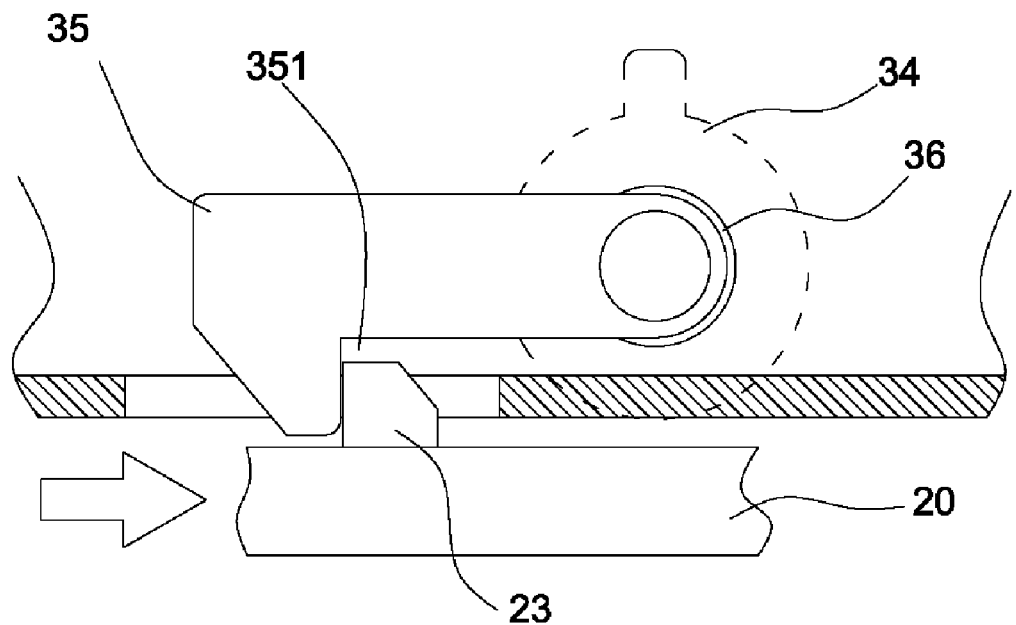
FIGS. 6A-6B are schematic drawings of operating a switch disk of a digital image capturing device.
Figure 6B:
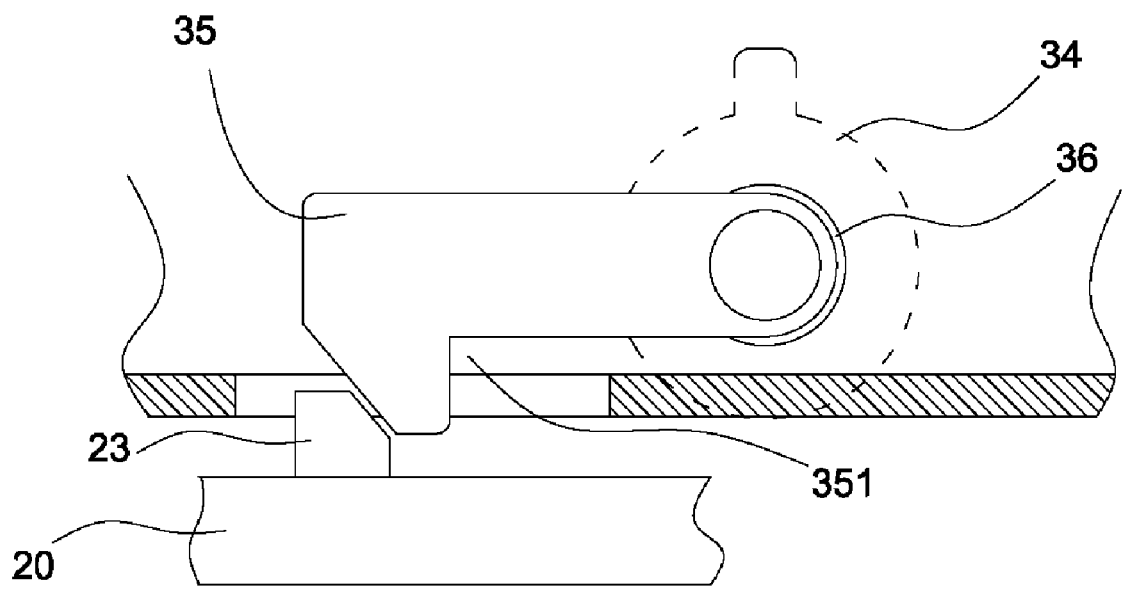

Please refer to FIGS. 5A-5B and 6A-6B. FIGS. 5A-5B are schematic drawings showing a first embodiment for turning on the digital image capturing device using the LCD. FIGS. 6A-6B are schematic drawings of operating a switch disk of the digital image capturing device 10.

When the digital image capturing device 10 is turned off, the position of the LCD 20 is shown in FIGS. 5A and 6A. The first protrusion 22 on the back of the LCD 20 touches the rotating element 32. Thus, the rotating element 32 can press the switching device 31, thereby turning off the digital image capturing device 10. The second protrusion 23 is held at a corner 351 of the hook 35, and, thus, the LCD 20 is securely attached. The elastic element 43 is then pressed. In order to turn on the digital image capturing device 10 via the LCD 20, the user turns the switch disk 34 to drive the hook 35, and the LCD 20 begins to slide due to the positional bias provided by the elastic element 43. When the LCD 20 slides to the left, the first protrusion 22 on the back of the LCD 20 simultaneously leaves the rotating element 32. Thus, the rotating element 32 releases the switching device 31, thereby turning on the digital image capturing device 10. A torsion spring 36 can be placed between the switch disk 34 and the hook 35, and the torsion spring 36 can pull the hook 35 back to the original position. After the digital image capturing device 10 has been turned on, the position of the LCD 20 is as shown in FIGS. 5B and 6B. When the user wants to turn off the digital image capturing device 10, he or she pushes the LCD 20 to the right. With the structure of the second protrusion 23 and the hook 35, the hook 35 begins to rotate, and the second protrusion 23 stops at the corner 351 of the hook 35. Thus, the LCD 20 is again securely attached.

Figure 7A:
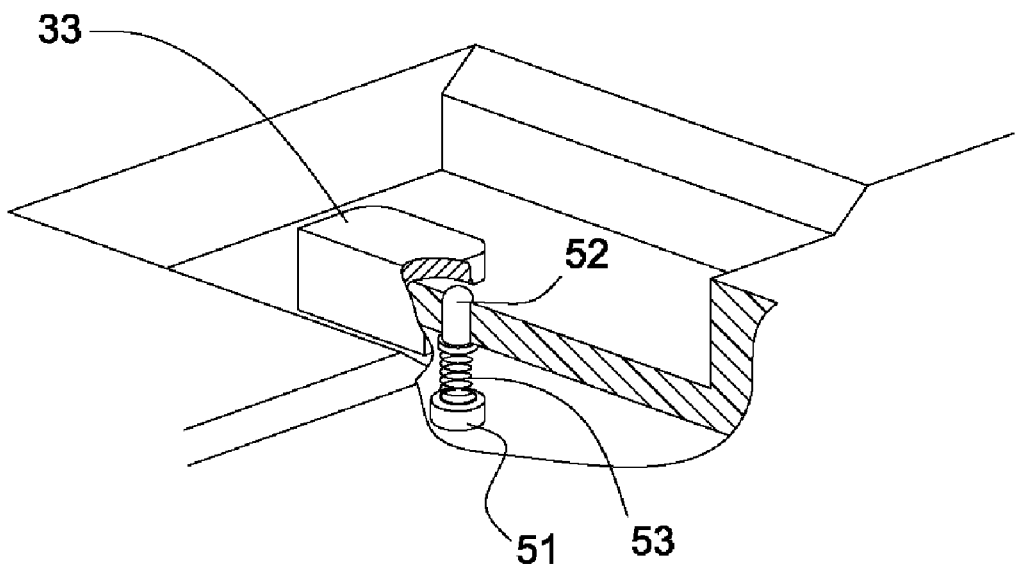
FIGS. 7A-7B are schematic drawings showing a second embodiment for turning on a digital image capturing device via an LCD.
Figure 7B:
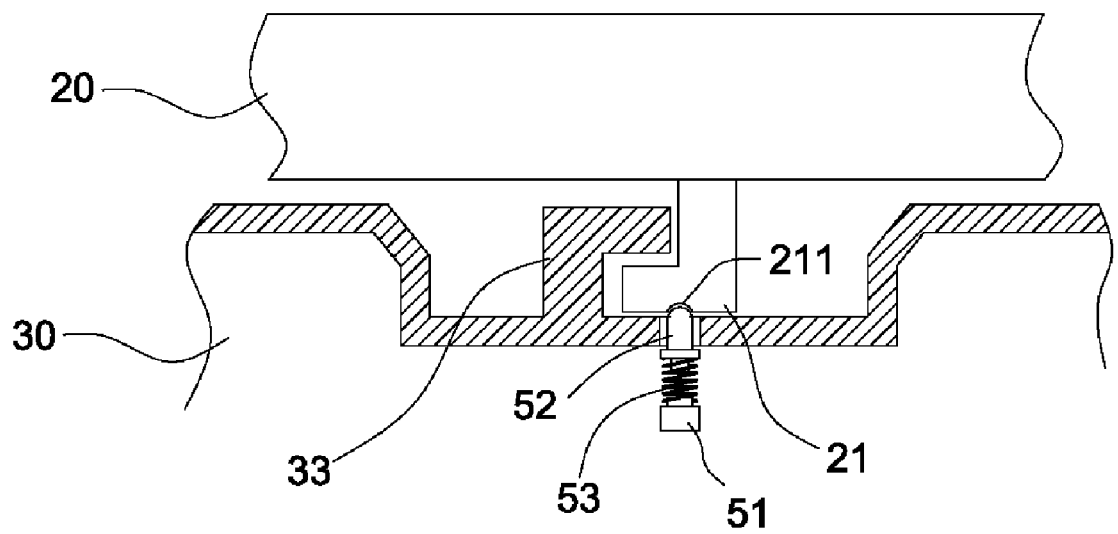

There can be other alternative methods to turn on the digital image capturing device 10. Please refer to FIGS. 7A-7B. FIGS. 7A-7B are schematic drawings showing a second embodiment for turning on the digital image capturing device with the LCD.

A switching device 51 is placed in a hole under the second fastening element 33. The switching device 51 has a driven element 52 and a small elastic element 53. The driven element 52 may be a cylinder, a sphere, or other various shapes. When the first fastening element 21 of the LCD 20 engages with the second fastening element 33 of the main body 30, the first fastening element 21 presses the driven element 52 and also indirectly presses the switching device 51 (as shown in FIG. 7B). Therefore, the digital image capturing device 10 is turned off. When the user wants to turn on the digital image capturing device 10, he or she may move the first fastening element 21. The driven element 52 is ejected by the small elastic element 53, the switching device 51 is no longer pressed, and the digital image capturing device 10 is, thus, turned on. The first fastening element 21 preferably has a groove 211 which can engage with the upper portion of the driven element 52, which prevents the LCD 20 from freely sliding when the digital image capturing device 10 is turned off.

Although the present invention has been explained in relation to its preferred embodiments, it is to be understood that many other possible modifications and variations can be made without departing from the spirit and scope of the invention as hereinafter claimed.

What is claimed is:

1. A digital image capturing device comprising:
   a liquid crystal display (LCD) having a first fastening element and a first protrusion; and a main body comprising:
   a sliding shaft;
   a sliding shaft sleeve slipped onto the sliding shaft and connected to the LCD, the sliding shaft sleeve enabling the LCD to slide left and right or to rotate forward and backward;
   a second fastening element for engaging with the first fastening element when the LCD slides to a predetermined position;
   a switching device for turning on or off the digital image capturing device; and a rotating element for controlling the switching device, with the first protrusion being used to push the rotating element to turn on or off the digital image capturing device.

2. The digital image capturing device as claimed in claim 1, wherein the digital image capturing device is a digital camera or a digital video camera.

3. The digital image capturing device as claimed in claim 1 further comprising:
an elastic element for providing an elastic bias to the sliding shaft sleeve to slide on the sliding shaft; and
a buffer element for increasing a frictional force when the sliding shaft sleeve slides or rotates on the sliding shaft.

4. The digital image capturing device as claimed in claim 3, wherein the buffer element is made of rubber.

5. The digital image capturing device as claimed in claim 1, wherein the main body further comprises a scoop channel, and the second fastening element is disposed in the scoop channel.

6. The digital image capturing device as claimed in claim 1, wherein the LCD further comprises an engaging element and a lateral rotating shaft sleeve securely attached to the sliding shaft sleeve to laterally rotate the LCD.

7. The digital image capturing device as claimed in claim 1, wherein the main body further comprises a plurality of function buttons.

8. A digital image capturing device comprising:
a liquid crystal display (LCD) having a first fastening element; and
a main body comprising:
a sliding shaft;
a sliding shaft sleeve slipped onto the sliding shaft and connected to the LCD, the sliding shaft sleeve enabling the LCD to slide left and right or to rotate forward and backward;
a second fastening element for engaging with the first fastening element when the LCD slides to a predetermined position:
a hook with a corner; and
a switch disk for controlling the rotation of the hook;
wherein the LCD further comprises a protrusion, and the hook engages the protrusion onto the corner.

9. The digital image capturing device as claimed in claim 8, wherein the main body further comprises a torsion spring for providing an elastic bias between the switch disk and the hook.

10. A digital image capturing device comprising:
a liquid crystal display (LCD) having a first fastening element; and
a main body comprising:
a sliding shaft;
a sliding shaft sleeve slipped onto the sliding shaft and connected to the LCD, with the sliding shaft sleeve used to enable the LCD to slide left and right or to rotate forward and backward;
a switching device for turning on or off the digital image capturing device;
a driven element for controlling the switching device; and
a second fastening element for engaging with the first fastening element when the LCD slides to a predetermined position; wherein the switching device and the driven element are located below the second fastening element, and wherein the first fastening element is used for pushing the driven element to turn on or off the digital image capturing device.

11. The digital image capturing device as claimed in claim 10, wherein the digital image capturing device is a digital camera or a digital video camera.

12. The digital image capturing device as claimed in claim 10, further comprising:
an elastic element for providing an elastic bias to the sliding shaft sleeve to slide on the sliding shaft; and
a buffer element for increasing a frictional force when the sliding shaft sleeve slides or rotates on the sliding shaft.

13. The digital image capturing device as claimed in claim 12, wherein the buffer element is made of rubber.

14. The digital image capturing device as claimed in claim 10, wherein the LCD further comprises an engaging element and a lateral rotating shaft sleeve securely attached to the sliding shaft sleeve to laterally rotate the LCD.

15. The digital image capturing device as claimed in claim 10, wherein the main body further comprises a plurality of function buttons.

16. The digital image capturing device as claimed in claim 10, wherein the main body further comprises a scoop channel, and the second fastening element is disposed in the scoop channel.

17. The digital image capturing device as claimed in claim 10, wherein a small elastic element is disposed between the switching device and the driven element.

18. The digital image capturing device as claimed in claim 10, wherein the first fastening element further comprises a groove, and the first fastening element is adapted to engage with the driven element through the groove.

19. The digital image capturing device as claimed in claim 10, wherein the driven element is a cylinder or a sphere.

* * * * *